(12) United States Patent
Lehr et al.

(10) Patent No.: US 8,095,768 B2
(45) Date of Patent: Jan. 10, 2012

(54) VSAM SMART REORGANIZATION

(75) Inventors: Douglas L. Lehr, Tucson, AZ (US);
Franklin E. McCune, Tucson, AZ (US);
David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/435,576

(22) Filed: May 5, 2009

(65) Prior Publication Data
US 2010/0287354 A1    Nov. 11, 2010

(51) Int. Cl.
*G11C 13/00*  (2006.01)
(52) U.S. Cl. .................. 711/171; 711/170; 707/200
(58) Field of Classification Search .................. 711/171, 711/170, 154, 165, 202, 216, 206, 103, 162, 711/159; 707/200, 824
See application file for complete search history.

(56) References Cited

U.S. PATENT DOCUMENTS

2010/0094811 A1*  4/2010  Lehr et al. .................... 707/674
2010/0228898 A1*  9/2010  Aranguren et al. ............. 710/56

OTHER PUBLICATIONS

Olsen, Charles E., "Design and Tuning of VSE/VSAM", IBM Global Services, zSeries Expo, Nov. 1-5, 2004, 86 pages.

* cited by examiner

*Primary Examiner* — Dang Nguyen
(74) *Attorney, Agent, or Firm* — Griffiths & Seaton PLLC

(57) ABSTRACT

Various embodiments for adaptive reorganization of a virtual storage access method (VSAM) data set are provided. In one exemplary embodiment, upon each control interval (CI) split of a plurality of CI splits occurring over a period of time, historical data including a key value for a record causing each CI split is recorded in a data repository. The historical data is analyzed with a predictive algorithm to determine an amount of free space to be allocated to each of a plurality of control intervals generated pursuant to the adaptive reorganization. The predictive algorithm allocates a greater percentage of the free space to a first location of the VVDS having a larger proportion of historically placed key values than a second location of the VVDS having a smaller proportion of the historically placed key values.

25 Claims, 3 Drawing Sheets

VSAM SMART REORGANIZATION

BACKGROUND OF THE INVENTION

1. Field of the Invention

The present invention relates in general to computers, and more particularly to a method, system, and computer program product for adaptive reorganization of virtual storage access method (VSAM) data sets in a computing storage environment.

2. Description of the Related Art

As indexed virtual storage access method (VSAM) data sets grow over time, records may be inserted anywhere in the file based on a key value of the record. The key determines where the data will be added in the data set. Those records are added to the control interval (CI), or a collection of records, which has the correct range of key values. If too many records are added to a particular CI, the CI will fill with the records, necessitating a split into two differing CIs. The new CIs will each contain half of the records in most cases. Those CIs will each then have 50% free space after the split. If the new CIs fill up again, they will again be split.

SUMMARY OF THE INVENTION

Each CI split causes contention and overhead within the data set, which can then lead to performance issues. Each split also results in CIs that no longer are physically in order on the disk. The logical order is kept within the index. Many times when a data set has a large number of splits, clients reorganize the file for performance reasons. This means a new data set is defined, and the records are put in sequential order into the new data set. The data set at this point does not have any splits.

When a data set is initially defined, the user specifies a free space value. This value determines how much space is left available for additional records in each CI. Today the free space value is a constant for the entire data set. If the user specifies too high of a value, the data set will waste space. If the user specifies too low of a value, then virtually all initially added records added at locations other than the end of the data set will require CI splits. Records must be added to a location where their key falls within the correct sequence of the remaining of the keys in the data set. Accordingly, if a CI has space, a record may still have to be added to a full CI if that CI location is where the key associated with the record dictates that it belongs.

In light of the foregoing, a need exists for a more intelligent mechanism to optimize the free space within an indexed VSAM data set. Accordingly, various embodiments for adaptive reorganization of an indexed VSAM data set are provided. In one exemplary embodiment, upon each control interval (CI) split of a plurality of CI splits occurring over a period of time, historical data including a key value for a record causing each CI split is recorded in a data repository. The historical data is analyzed with a predictive algorithm to determine an amount of free space to be allocated to each of a plurality of control intervals generated pursuant to the adaptive reorganization. The predictive algorithm allocates a greater percentage of the free space to a first location of the data set having a larger proportion of historically placed key values than a second location of the data set having a smaller proportion of the historically placed key values. Additional method, system, and computer program product embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for dynamic and adaptive reorganization of indexed VSAM data sets. The illustrated embodiments utilize historical data collected for each data set to predict the type of key values that will be added in the future. This information is used when a data set is reorganized to allocate differing amounts of free space in various areas of the data set. Those area expected to receive a large influx of records are allocated a larger amount of free space. Conversely, those areas which are not expected to have records added, or are expected to receive a smaller influx of records are allocated a smaller amount or no free space. Accordingly, the foregoing methodology optimizes free space allocation so that records may be added without causing large numbers of CI splits, thus improving performance and resource allocation in the computing environment.

Figure 1:
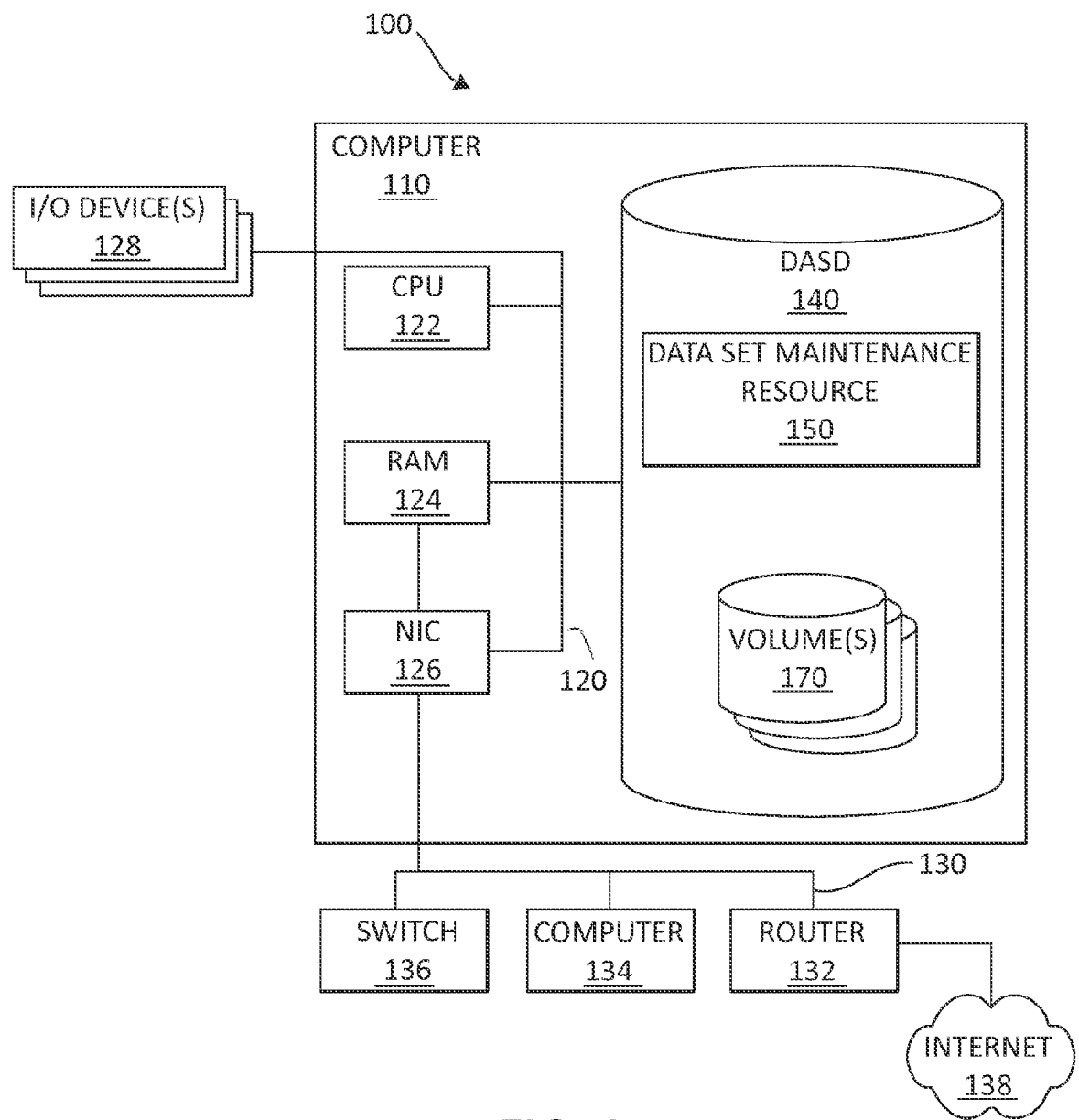
FIG. 1 is an exemplary computing environment.

FIG. 1 depicts one embodiment of a computer system for adaptive VSAM data set reorganization in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set maintenance resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set maintenance resource 150. In the depicted embodiment, the data set maintenance resource 150 is housed entirely within the DASD 140. The DASD 140 may comprise volumes 170. As will be further illustrated, the volumes may comprise VSAM data sets. Volumes 170 may comprise data regarding the data sets (i.e., metadata) as well as the VSAM data sets themselves.

Figure 2:
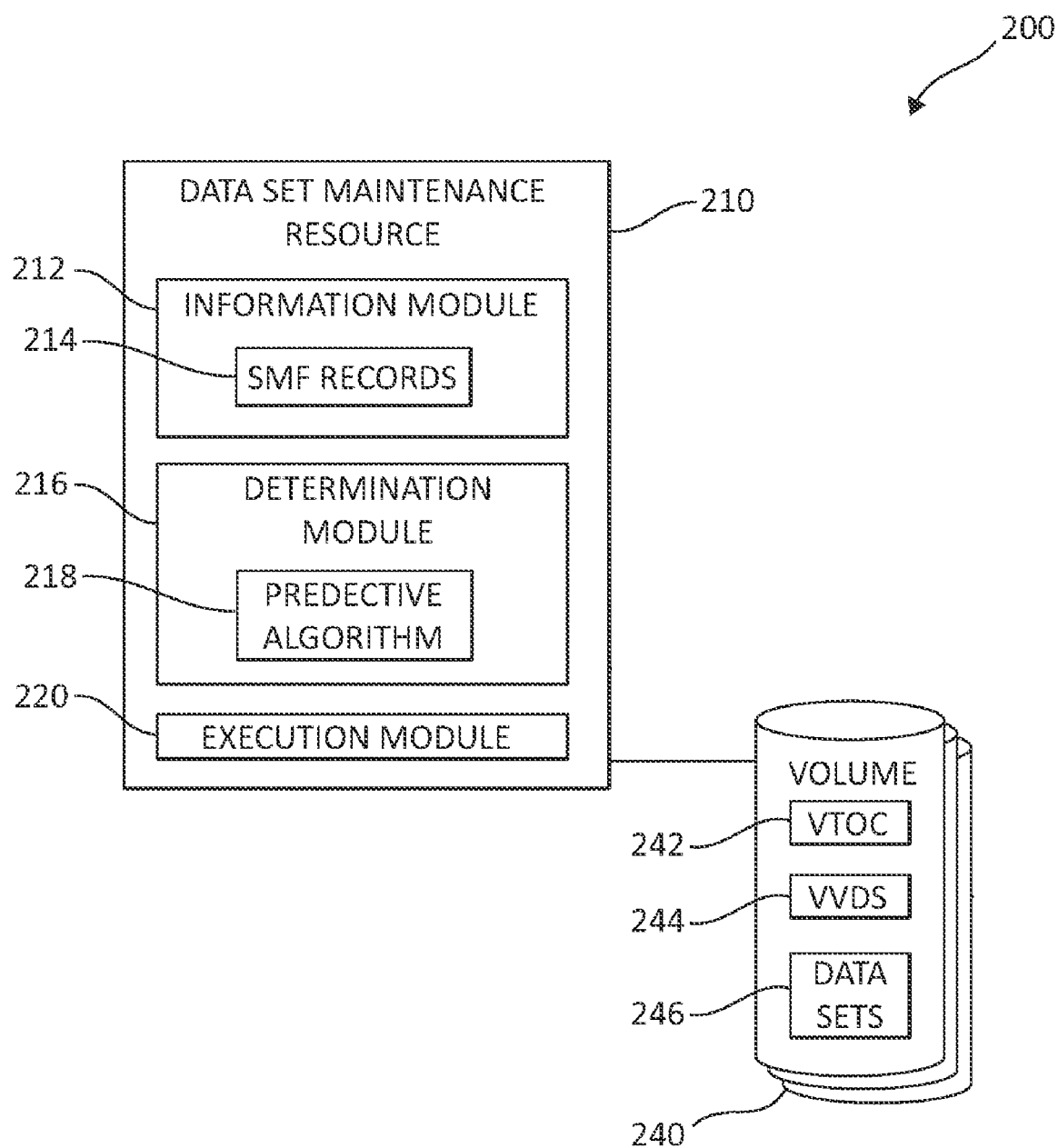
FIG. 2 is an exemplary data set maintenance resource for performing defragmentation functionality.

FIG. 2 depicts one embodiment of a DASD environment 200 comprising a data set maintenance resource 210 and a collection of volumes 240 in accordance with the present invention. The DASD environment 200 includes a data set maintenance resource 210, an information module 212, system management facility (SMF) records 214, a determination module 216 including one or more predictive algorithms 218, and an execution module 220. The data set maintenance resource 210 is in communication with the volumes 240, each of which further comprises a volume table of contents (VTOC) 242, a VSAM volume data set (VVDS) 244, and data sets 246.

In the depicted embodiment, the data set maintenance resource 210 includes the information module 212, the determination module 216, and the execution module 220. One or more of these modules may be adapted for performing VSAM data set reorganization functionality as will be described below. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed pursuant to defragmentation. Other information retrieved by the information module may include a data set name, catalog status, the type entry in the catalog such as the type of data set or the VSAM index of a VSAM data set, or associated data set names if applicable. The information module 212 includes SMF records 214 in a data repository for tracking such actions as opening a file, closing a file, and catalog updates of VSAM data sets.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In the depicted embodiment, the determination module 216 analyzes the historical information to determine one or more operations to perform in which a varying amount of free space is allocated to a particular CI in a VSAM data set 246 pursuant to one or more predictive algorithms 218, as will be further described. The determination module 216 leverages historical information about the allocation of free space to previously used data sets 246 (which, in one embodiment, is maintained as a portion of SMF records 214) to determine the one or more free space allocation operations to perform. In this way, the determination module 216 may use the historical information obtained from the information module 212 for further determination in the data set maintenance resource 210.

The execution module 220 executes one or more generated control statements to perform free space allocation operations on the volume 240. In one embodiment, the execution module 220 selects a utility to execute the generated control statement with, such as a Data Set Services (DFSMSdss) utility.

The data set maintenance resource 210 is in communication with volumes 240. The data set maintenance resource 210 utilizes the VTOC 242 to obtain information about volumes 240 and data sets 246. The VTOC 242 may store certain information regarding data sets such as data set attributes and a description, which may include size, location, and extent information. The VVDS 244 may also be used by the data set maintenance resource 210 to obtain information regarding data sets 246.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

Figure 3:
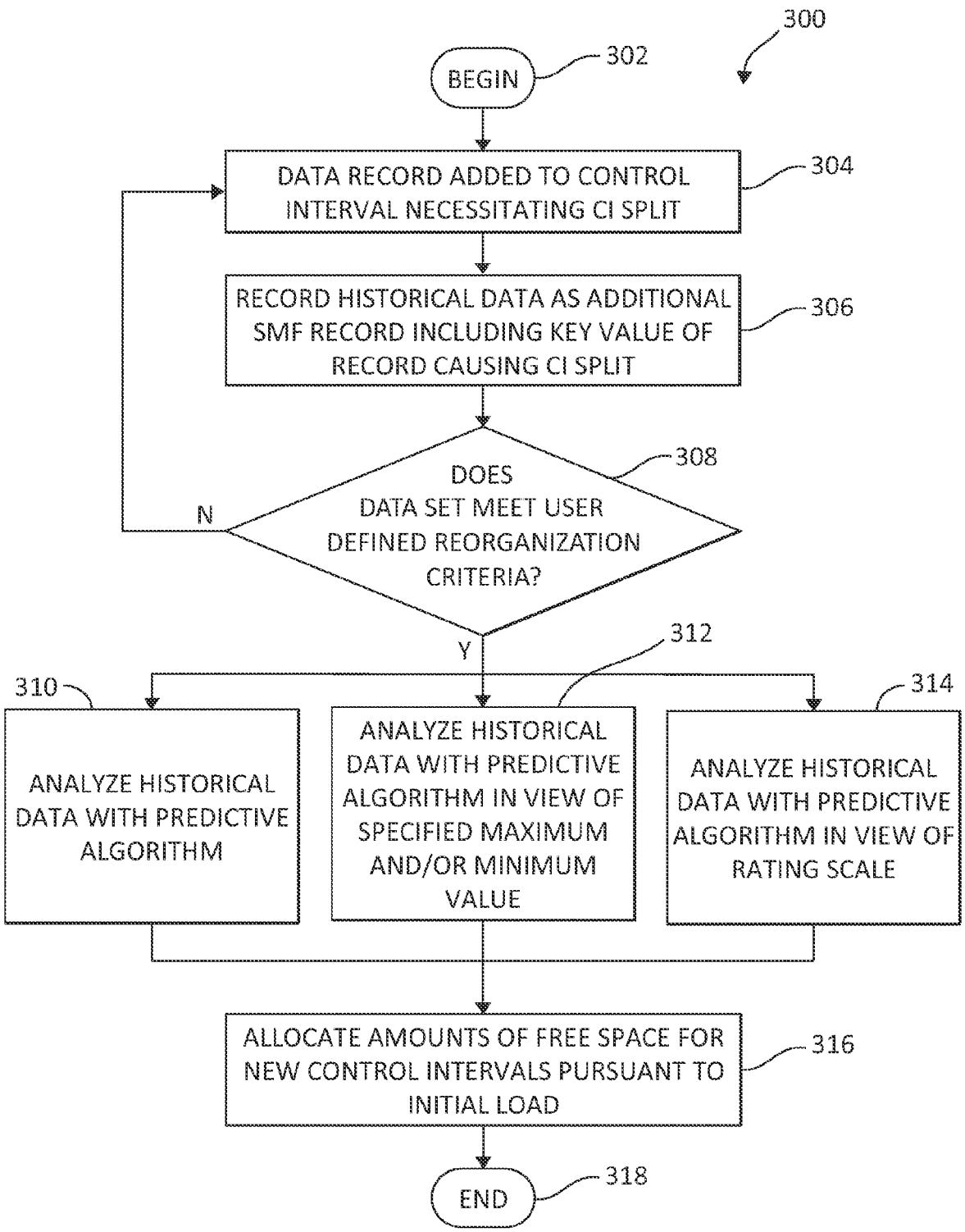
FIG. 3 is a flow chart diagram of an exemplary method for adaptive reorganization of an indexed VSAM data

The following methodology may be implemented by the data set maintenance resource 210 in conjunction with other components in the computing environment to perform adaptive and dynamic reorganization of indexed VSAM data sets. The skilled artisan will bear in mind, however, that various steps in the following description, figures, and claimed subject matter may be executed and/or carried out in differing orders according to a particular implementation. For example, the following methodology describes one exemplary order. FIG. 3, following, will illustrate the following methodology as implemented in various embodiments.

As a first step, as was previously described, historical information is retained for each CI split in the data set that occurs over a period of time. In one embodiment, this historical information is incorporated into a SMF record. Typically, SMF records are kept for opens, closes, and catalog updates of VSAM data sets. In one embodiment, these SMF records will also be cut anytime a CI split occurs. The key value of the record that caused the split will be recorded. This data will be used to analyze the key trends for that file. Consider the following scenarios for historical key placement over a period of time. In one situation, the files have totally random keys added throughout the data set. For this type of data set, the free space should be fairly consistent throughout the file. In other situations the data sets may have key values based on dates, sequential transaction numbers, or other data which creates a usage pattern where the majority of inserts occurs in certain regions of the data set.

When the data set becomes large enough to have a large number of CI splits, clients often reorganize the file. During this reorganization a new version of the data set is created, and the data set is loaded with the records from the old data set for the first time. This period is known as initial load. At this point, the amount of free space is preserved in each CI. Once that threshold value is reached, a new CI is created for the next record and the remaining space is set aside for future updates. This may also occur if the user add records via a mass update, where a large number of records are added at one time. One aspect of the present invention is the utilization of the historical data from the new SMF records to predict where (what locations(s) in the dataset) the majority of subsequent key additions will take place. Those locations are then allocated with a higher percentage of free space.

In one embodiment, the user may specify a minimum and/or a maximum value to use for free space. If, for example, the historical analysis shows that no records have been added to a particular region of the data set, those areas will receive the minimum amount of free space as specified by the user. For those areas where the future additional records are expected, the maximum value of the free space will be used. This will then insure that areas that have little or no additions will not waste free space. Those areas that are expected to have additions will have the maximum user specified free space available. For example, if a user specifies Freespace_Range (5, 90), the areas of low expected inserts will only have 5% free space and the areas with the highest expected inserts would have 90% free space.

A further embodiment of the present invention uses a rating scale where the free space amount is adjusted on a sliding scale for each CI. The distribution of historically placed key values is segmented into portions, such as quartiles. For example, those areas in the bottom 25% (bottom quartile) of expected activity are allocated the lowest value of free space. Those in the 2nd quartile of expected inserts are allocated a free space value equal to the lowest value+33% of the highest value (5+30=35% free space). Those in the 3rd highest quartile of expected inserts are allocated a value equal to the lowest value to +66% of the highest value (5+60=65% free space). Finally those in the highest quartile would receive the maximum free space value specified by the user, which in this case is 90%.

Turning to FIG. 3, a logic flow diagram of an exemplary method 300 for performing adaptive reorganization of indexed VSAM data sets in a computing storage environment is depicted. As described above, method 300 illustrates various alternative embodiments of the methodology previously described. As one skilled in the art will appreciate, the described method may be implemented by various means, such as hardware, firmware, software provided by hardware, firmware, etc., or a combination thereof operational on or otherwise associated with the computing environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 300 begins (step 302) with a data record added to a particular control interval necessitating a CI split (step 304).

Historical data, including the key value of the record causing the split, is recorded in a data repository, for example as part of an SMF record (step 306). If the data set doesn't contain a large enough number of CI splits to meet user-defined criteria for reorganization (step 308), the steps 304 and 306 continue until this is the case. User-defined criteria may include, but are not limited to, factors such as the number of splits, number of empty control areas (CAs) or CIs, number of extents, and repairing damaged indexes.

As a next step, the historical information is analyzed to predict, based on the historical analysis, what locations of the data set various key values will be placed in the future. One or more predictive algorithms may be implemented to perform this historical analysis and to determine appropriate allocation of free space, as a result. In one embodiment, the predictive algorithm is used for the analysis (step 310). In an alternative embodiment, the historical data is analyzed using the predictive algorithm in view of a specified maximum and/or minimum free space value as previously described (step 312). In still another embodiment, the historical data is analyzed using the predictive algorithm in view of a rating scale as previously described (step 314).

Once the data is analyzed, then based on the analysis varying amounts of free space are allocated for new control intervals pursuant to an initial load operation (step 316). As indicated previously, those areas showing large numbers of historically placed key values are allocated a higher percentage of free space going forward. Conversely, those areas showing smaller or no historically placed key values are allocated smaller or no free space going forward. The method 300 then ends (step 318).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for storage and for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for adaptive reorganization of an indexed virtual storage access method (VSAM) data set by a processor device in a computer storage system, comprising:
upon each control interval (CI) split of a plurality of CI splits occurring over a period of time, recording historical data including a key value for a record causing each CI split in a data repository; and
analyzing the historical data with a predictive algorithm to determine an amount of free space to be allocated to each of a plurality of control intervals generated pursuant to the adaptive reorganization; wherein the predictive algorithm allocates a greater percentage of the free space to a first location of the data set having a larger proportion of historically placed key values than a second location of the data set having a smaller proportion of the historically placed key values.

2. The method of claim 1, further including specifying a minimum value for the amount of the free space; wherein if a third location of the data set is determined to have received none of the historically placed key values, the minimum value is allocated to the third location.

3. The method of claim 1, further including specifying a maximum value for the amount of the free space; wherein if a third location of the data set is determined to have received a largest amount of the historically placed key values, the maximum value is allocated to the third location.

4. The method of claim 1, further including implementing a rating scale to determine the amount of the free space; wherein the rating scale divides each of the historically placed key values into predefined portions of a total distribution of the historically placed key values, each of the predefined portions allocated a predefined percentage of free space.

5. The method of claim 1, wherein the recording the historical data includes logging the historical data as a system management facility (SMF) record.

6. The method of claim 5, wherein logging the historical data includes, upon each CI split, cutting the SMF record.

7. The method of claim 1, wherein the analyzing the historical data with the predictive algorithm occurs pursuant to an initial load operation.

8. A method for adaptive reorganization of an indexed virtual storage access method (VSAM) data set by a processor device in a computer storage system following a plurality of control interval (CI) split operations, the adaptive reorganization creating a plurality of new control intervals, each allocated an amount of free space, comprising:
allocating the free space based on analysis of historical information obtained during the plurality of CI split operations; wherein a first new control interval in a first location of the data set having a larger proportion of key values causing a larger portion of the plurality of CI split operations is allocated a larger amount of the free space than a second new control interval in a second location of the data set having a smaller proportion of the key values causing a smaller portion of the plurality of CI split operations.

9. The method of claim 8, further including recording the historical information pursuant to each of the plurality of CI split operations in a data repository.

10. The method of claim 9, wherein the recording the historical information includes logging the historical information as a system management facility (SMF) record.

11. The method of claim 8, further including pursuant to distributing the free space, incorporating an estimate of a minimum allocable free space to be distributed to new control intervals of the plurality of new control intervals having a smallest proportion of the key values causing a smallest portion of the plurality of CI split operations.

12. The method of claim 8, further including pursuant to distributing the free space, incorporating an estimate of a maximum allocable free space to be distributed to new control intervals of the plurality of control intervals having a largest proportion of the key values causing a largest portion of the plurality of CI split operations.

13. A system for adaptive reorganization of an indexed virtual storage access method (VSAM) data set, comprising:
a processor operable in a computer system, wherein the processor is adapted for:
upon each control interval (CI) split of a plurality of CI splits occurring over a period of time, recording historical data including a key value for a record causing each CI split in a data repository, and
analyzing the historical data with a predictive algorithm to determine an amount of free space to be allocated to each of a plurality of control intervals generated pursuant to the adaptive reorganization, wherein the predictive algorithm allocates a greater percentage of the free space to a first location of the data set having a larger proportion of historically placed key values than a second location of the data set having a smaller proportion of the historically placed key values.

14. The system of claim 13, wherein the processor is further adapted for specifying a minimum value for the amount of the free space, wherein if a third location of the data set is determined to have received none of the historically placed key values, the minimum value is allocated to the third location.

15. The system of claim 13, wherein the processor is further adapted for specifying a maximum value for the amount of the free space, wherein if a third location of the data set is determined to have received a largest amount of the historically placed key values, the maximum value is allocated to the third location.

16. The system of claim 13, wherein the processor is further adapted for implementing a rating scale to determine the amount of the free space; wherein the rating scale divides each of the historically placed key values into predefined portions of a total distribution of the historically placed key values, each of the predefined portions allocated a predefined percentage of free space.

17. The system of claim 13, wherein the historical data is a system management facility (SMF) record.

18. The system of claim 17, wherein the processor is further adapted for, pursuant to recording the historical data, cutting the SMF record.

19. The system of claim 13, wherein the analyzing the historical data with the predictive algorithm occurs pursuant to an initial load operation performed by a client.

20. A computer program product for adaptive reorganization of an indexed virtual storage access method (VSAM) data set, the computer program product comprising a computer-readable storage medium having computer-readable program code portions stored therein, the computer-readable program code portions comprising:

a first executable portion for, upon each control interval (CI) split of a plurality of CI splits occurring over a period of time, recording historical data including a key value for a record causing each CI split in a data repository; and a second executable portion for analyzing the historical data with a predictive algorithm to determine an amount of free space to be allocated to each of a plurality of control intervals generated pursuant to the adaptive reorganization; wherein the predictive algorithm allocates a greater percentage of the free space to a first location of the data set having a larger proportion of historically placed key values than a second location of the data set having a smaller proportion of the historically placed key values.

21. The computer program product of claim 20, further including a third executable portion for specifying a minimum value for the amount of the free space; wherein if a third location of the data set is determined to have received none of the historically placed key values, the minimum value is allocated to the third location.

22. The computer program product of claim 20, further including a third executable portion for specifying a maximum value for the amount of the free space; wherein if a third location of the data set is determined to have received a largest amount of the historically placed key values, the maximum value is allocated to the third location.

23. The computer program product of claim 20, further including a third executable portion for implementing a rating scale to determine the amount of the free space; wherein the rating scale divides each of the historically placed key values into predefined portions of a total distribution of the historically placed key values, each of the predefined portions allocated a predefined percentage of free space.

24. The computer program product of claim 20, further including a fourth executable portion for, pursuant to the recording the historical data, logging the historical data as a system management facility (SMF) record.

25. The computer program product of claim 20, wherein the second executable portion for analyzing the historical data with the predictive algorithm is executed pursuant to an initial load operation.

\* \* \* \* \*